United States Patent
Bigge et al.

(10) Patent No.: US 7,610,849 B2
(45) Date of Patent: Nov. 3, 2009

(54) IN-DOOR COFFEE MAKER FOR REFRIGERATORS

(75) Inventors: William J. Bigge, St. Joseph, MI (US); Steven C. Drees, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 660 days.

(21) Appl. No.: 11/371,796

(22) Filed: Mar. 9, 2006

(65) Prior Publication Data

US 2007/0209522 A1    Sep. 13, 2007

(51) Int. Cl.
*A47J 31/00*    (2006.01)
*F25D 23/12*    (2006.01)
*B67D 5/62*    (2006.01)

(52) U.S. Cl. .................. 99/290; 99/275; 62/390

(58) Field of Classification Search .......... 99/290, 99/275, 306, 307, 295; 62/389, 390, 391, 62/392; 222/146.1, 146.2, 146.6
See application file for complete search history.

(56) References Cited

U.S. PATENT DOCUMENTS

| | | | |
|---|---|---|---|
| 4,196,658 A | 4/1980 | Takagi et al. | 99/286 |
| 5,219,103 A | 6/1993 | Carper | 222/240 |
| 5,233,914 A | 8/1993 | English | 99/282 |
| D340,831 S | 11/1993 | Manabe | D7/305 |
| 5,603,230 A * | 2/1997 | Tsai | 62/390 |
| 5,971,213 A * | 10/1999 | Lee | 222/146.6 |
| 6,099,878 A | 8/2000 | Arksey | 426/231 |
| 6,321,638 B1 * | 11/2001 | Schmed | 99/279 |
| D479,431 S | 9/2003 | Jung et al. | D7/351 |
| 6,737,620 B2 | 5/2004 | Kim | 219/679 |
| 2003/0097314 A1 * | 5/2003 | Crisp et al. | 705/28 |
| 2006/0011067 A1 * | 1/2006 | Spencer | 99/307 |
| 2007/0023451 A1 * | 2/2007 | Bordino | 222/146.5 |
| 2007/0283817 A1 * | 12/2007 | Fugger et al. | 99/290 |

* cited by examiner

*Primary Examiner*—Reginald L Alexander
(74) *Attorney, Agent, or Firm*—Kirk W. Goodwin; Greer, Burns & Crain Ltd

(57) ABSTRACT

A refrigerator has a cabinet including a refrigeration compartment and a supply of water in the cabinet, with a door attached to the cabinet to selectively open and close access to the refrigeration compartment. A water conduit is located in the door to supply water from the cabinet supply of water to a point of utilization in the door. A water heater is located in the door arranged to heat water from the cabinet supply of water. A brew chamber is located in the door and arranged to receive a supply of ground coffee beans and water heated by the water heater to make brewed coffee. A dispensing outlet communicates with the brew chamber to allow for the dispensing of the brewed coffee at the door of the refrigerator, and a control is provided to control the heating of the water and the dispensing of the brewed coffee.

21 Claims, 1 Drawing Sheet under the US 7,610,849 B2

IN-DOOR COFFEE MAKER FOR REFRIGERATORS

BACKGROUND OF THE INVENTION

The present invention relates generally to a refrigerator having an in-door coffee maker.

Refrigerators with water and/or ice dispensing units are well known. Also known are coffee makers that use prepackaged bags or pods of ground coffee beans, or which accept whole coffee beans and include a grinding mechanism to grind a sufficient quantity of beans as needed to brew a desired quantity of coffee.

Coffee makers are known which brew an entire pot of coffee, generally enough for at least 6 to 8 cups of coffee, and also, single serve coffee makers are known, such as disclosed in U.S. Pat. No. 5,233,914, for people who wish no more than a single cup of coffee, rather than brewing multiple cups at one time. Coffee maker are also know to incorporate coffee bean frinders with the brew chamber, as disclosed in U.S. Pat. No. 4,196,658.

A disadvantage of coffee makers is that they require a certain amount of counter space in the kitchen, or are required to be mounted hanging from the underside of an upper cabinet. In some cases, coffee makers have been combined with other counter top appliances, such as disclosed in U.S. Pat. Nos. D340,831, D479,431 and 6,737,620. However, these combination appliances merely take up more counter space. Another disadvantage is that such coffee makers require the user to measure out and dispense a quantity of water to the coffee maker each time a pot or cup of coffee is to be brewed.

SUMMARY OF THE INVENTION

The present invention solves the identified problems and provides convenience to the user, including:

A system that is already plumbed in a refrigerator or water and/or ice, thereby eliminating the need for consumers to refill a water reservoir each time coffee is to be brewed.

A space saving appliance, since the user will not necessarily need to have an additional coffee maker taking up counter space, or undercabinet space in the kitchen.

Presenting a central location for beverage dispensing in the kitchen, that being at the refrigerator, where not only cold water and ice, or other chilled beverages from inside the refrigerator may be obtained, but also coffee and other brewed hot beverages as well.

In an embodiment of the invention, a refrigerator comprises a cabinet including a refrigeration compartment and a supply of water in the cabinet, with a door attached to the cabinet to selectively open and close access to the refrigeration compartment. A water conduit is located in the door to supply water from the cabinet supply of water to a point of utilization in the door. A water heater is located in the door arranged to heat water from the cabinet supply of water. A brew chamber is located in the door and arranged to receive a supply of ground coffee beans and water heated by the water heater to make brewed coffee. A dispensing outlet communicates with the brew chamber to allow for the dispensing of the brewed coffee at the door of the refrigerator, and a control is provided to control the heating of the water and the dispensing of the brewed coffee.

In an embodiment, the refrigerator further includes insulation between the water heater and the refrigeration compartment.

In an embodiment, the brew chamber includes an area for receiving a porous package of ground coffee beans. In an embodiment, the area comprises a removable chamber.

In an embodiment, the brew chamber is sized to provide a single serving of coffee.

In an embodiment, the refrigerator includes a reservoir for receiving and holding whole coffee beans. In an embodiment, the reservoir is located in the door. In an embodiment, the reservoir includes a grinding mechanism to grind the whole coffee beans. In an embodiment, the refrigerator includes a mechanism for transporting ground coffee beans from the grinding mechanism to the brew chamber.

In an embodiment, the refrigerator includes a collection chamber for grounds used in the brew chamber. In an embodiment, the refrigerator includes a filled collection chamber indicator.

In an embodiment, the dispensing outlet comprises two dispensers for dispensing brewed coffee.

In an embodiment, the dispensing outlet comprises a water dispenser in addition to a coffee dispenser at the door.

In an embodiment, the dispensing outlet comprises an ice dispenser in addition to a coffee dispenser at the door.

In an embodiment, the refrigerator includes a water pump between the water heater and the brew chamber.

These and other aspects and details of the present invention will become apparent upon a reading of the detailed description and a review of the accompanying drawings. Specific embodiments of the present invention are described herein. The present invention is not intended to be limited to only these embodiments. Changes and modifications can be made to the described embodiments and yet fall within the scope of the present invention.

DETAILED DESCRIPTION OF THE PREFERRED EMBODIMENTS

Figure 1:
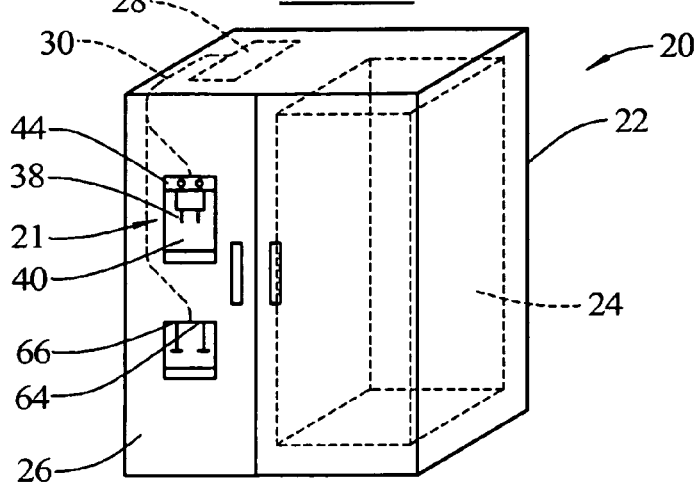
FIG. 1 is a front perspective view of a refrigerator cabinet incorporating the principles of the present invention.

In an embodiment of the invention, a refrigerator 20 is provided with an in-door coffee maker 21. The refrigerator comprises a cabinet 22 including an interior refrigeration compartment 24 for holding food and other items to be held at a reduced temperature. The refrigerator may include two or more refrigeration compartments which may be kept at different temperatures, such as one below the freezing temperature of water and the other above the freezing temperature of water. The refrigerator 20 includes a door 26 attached to the cabinet 22 to selectively open and close access to the refrigeration compartment 24. More than one door 26 may be provided as well. Although FIG. 1 illustrates an embodiment known as a side-by-side refrigeration appliance, the present invention may also be provided in single door refrigerators and refrigerators with a top mount freezer compartment or a bottom mount refrigeration compartment.

Figure 2:
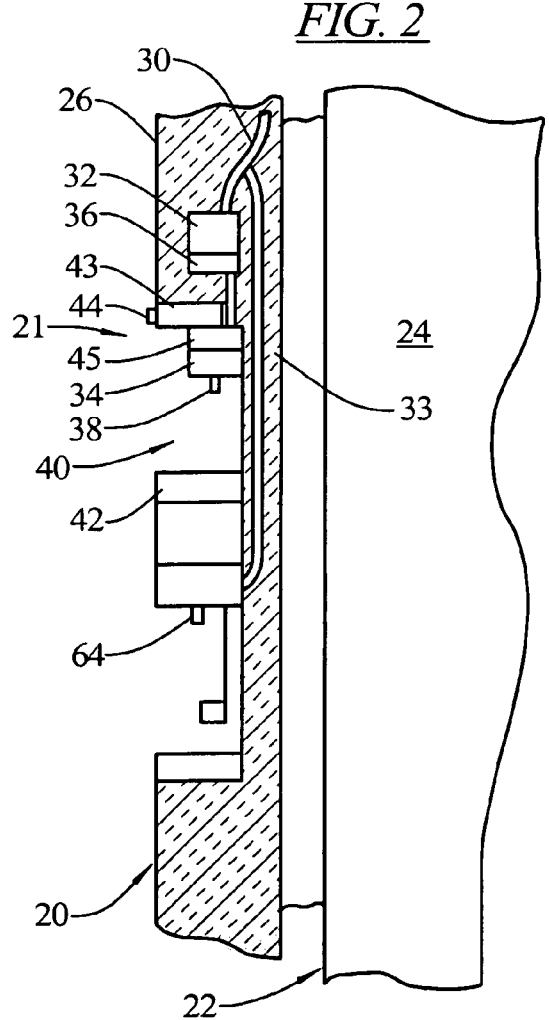
FIG. 2 is a side sectional view of a first embodiment of the coffee maker in the door of the refrigerator of FIG. 1.
Figure 3:
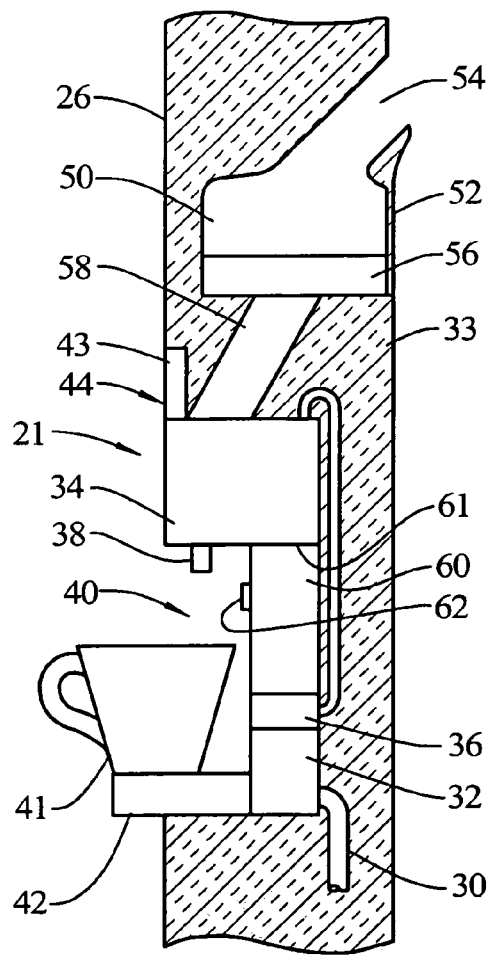
FIG. 3 is a side sectional view of a second embodiment of the coffee maker in the door of the refrigerator of FIG. 1.

A supply of water 28 is provided in the cabinet 22. This supply of water may come from a domestic water supply, such as the plumbing system of a house or office where the refrigerator is located. As shown in FIGS. 2 and 3, a water conduit 30 is located in the door 26 to supply water from the cabinet supply of water 28 to one or more points of utilization in the door, as described below. The water conduit 30 may come from the supply of water 28 through a top hinge of the door 26, or a bottom hinge of the door, or some other connection arrangement. The coffee maker 21 includes a water heater 32 located in the door 26 and arranged to heat water received from the cabinet supply of water 28. Insulation 33 is provided in the door to prevent heat from the water heater 32 from flowing to the refrigeration compartment 24.

A brew chamber 34 for the coffee maker 21 is located in the door 26 and is arranged to receive a supply of ground coffee beans and water heated by the water heater 32 to make brewed coffee. The water may be transported from the water heater 32 to the brew chamber 34 by means of a pump 36, particularly if the water heater 32 is located at a lower elevation in the door 26 than the brew chamber 34, as illustrated in the embodiment of FIG. 3.

A dispensing outlet 38 communicates with the brew chamber 34 to allow for the dispensing of the brewed coffee at the door 26 of the refrigerator 20. The dispensing outlet 38 may be located in a recess 40 in the door 26, sized to receive a coffee cup 41, or other container. In some embodiments (as seen in FIG. 1), two dispensing outlets 38 may be provided in the recess 40. An overflow reservoir 42 may be provided below the recess 40 to capture and hold any overflows or spills from the coffee cup 41, or to provide a collection area if a user fails to properly place a coffee cup or other container in the recess before the dispensing of the brewed coffee begins.

A control 43 is provided, which may include various input buttons or switches 44 on the door 26 of the refrigerator 20. The control 43 is used to control the heating of the water and the dispensing of the brewed coffee. The control 43 may also operate the pump 36 if one is provided.

In an embodiment of the coffee maker 21 such as shown in FIG. 2, the brew chamber 34 includes an area 45 for receiving a porous package of ground coffee beans. The area 45 may comprise a removable chamber, such as a drawer that the user can remove and replace, allowing for a change of the package of ground coffee beans when it is desired to brew additional coffee. In such an arrangement, the brew chamber 34 may be sized to provide a single serving of coffee, or in some embodiments, two servings of coffee.

To operate such an embodiment of the coffee maker 21, the user would place a package of ground coffee beans in the area 45 of the brew chamber 34, and the cup 41 to receive brewed coffee in the recess 40, and then operate the control 43 to begin the brewing of the coffee. A volume of water would be supplied to the water heater 32, and once heated to the proper temperature, the water would be transported to the brew chamber 34. After the water has been in contact with the ground coffee beans for a sufficient amount of time, the brewed coffee is dispensed through the dispensing outlet 38 into the waiting coffee cup 41.

If a user simply wanted a cup of hot water, such as for brewing tea or making instant coffee, the user would merely omit placing the ground coffee beans in the area 45 of the brew chamber 34, so that the water heated by the water heater 32 would be dispensed to the dispensing outlet 38, perhaps following a holding period in the brew chamber 34. The control 43 could be provided with an input selection for hot water only, which would permit avoidance of the holding period in the brew chamber 34.

In another embodiment of the invention, as shown in FIG. 3, the refrigerator 20 includes a reservoir 50 for receiving and holding whole coffee beans. In an embodiment, the reservoir 50 is located in the door 26. In such an embodiment, the reservoir 50 may be located such that it is in thermal communication with the refrigeration compartment 24, such as being isolated by a thin, non-insulated wall or liner 52, or an open chute 54, so that the whole coffee beans will be retained in a fresh state for a longer period of time, such as disclosed in U.S. Pat. No. 5,219,103. In an embodiment, the reservoir 50 includes a grinding mechanism 56 to grind the whole coffee beans, as needed for a particular brewing cycle. This grinding mechanism 56 may be located at the bottom of the reservoir 50 so that it is gravity fed or it may located elsewhere, with the beans being transported to the grinding mechanism manually or by some mechanical transport arrangement. In an embodiment, the refrigerator 20 includes a mechanism 58 for transporting ground coffee beans from the grinding mechanism 56 to the brew chamber 34. If the grinding mechanism 56 is located above the brew chamber 34, the transport mechanism 58 may be as simple as a connecting tube or passage, or the mechanism may be more complex, particularly if the grinding mechanism 56 is located some distance away from or below the brew chamber 34.

The ground coffee beans will arrive in the brew chamber 34, and following the introduction of water from the water heater 32, brewed coffee will be available for dispensing from the dispensing outlet 38, as described above.

In an embodiment where loose coffee grounds are placed into the brew chamber 34, the refrigerator 20 may include a collection chamber 60 for grounds that have been used in the brew chamber. The collection chamber 60 may be located below the brew chamber 34 so that the used grounds may be moved to the collection chamber upon operation of a door 61 and gravity, or a more complex arrangement may be provided for moving the used grounds from the brew chamber 34 to the collection chamber 60. In an embodiment, the collection chamber 60 may be provided with an indicator 62 to provide a visual or audible indication to the user that the chamber is filled and requires cleaning. The indicator 62 could be located on the collection chamber 60, or could be located on a control panel adjacent to the input buttons 44.

In an embodiment, a second dispensing outlet 64, in the form of a water dispenser may be provided in addition to the coffee dispensing outlet 38 at the door 26. This will allow for the dispensing of cold water, as is known in refrigeration appliances. A third dispensing outlet 66, in the form of an ice dispenser may also be provided in addition to the coffee dispensing outlet 38 at the door 26.

The present invention has been described utilizing particular embodiments. As will be evident to those skilled in the art, changes and modifications may be made to the disclosed embodiments and yet fall within the scope of the present invention. For example, various components could be utilized separately or independently in some embodiments without using all of the other components in the particular described embodiment. The disclosed embodiment is provided only to illustrate aspects of the present invention and not in any way to limit the scope and coverage of the invention. The scope of the invention is therefore to be limited only by the appended claims.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A refrigerator comprising:
 a cabinet including a refrigeration compartment and a supply of water in said cabinet,
 a door attached to said cabinet to selectively open and close access to said refrigeration compartment,
 a water conduit located in said door to supply water from said cabinet supply of water to a point of utilization in said door, a water heater in said door arranged to heat water from said cabinet supply of water, a brew chamber located in said door and arranged to receive a supply of ground coffee beans and water heated by said water heater to make brewed coffee, a dispensing outlet communicating with said brew chamber to allow for the dispensing of said brewed coffee at said door of said refrigerator, said dispensing outlet comprising two dispensers for dispensing brewed coffee, and a control for controlling said heating of said water and said dispensing of said brewed coffee.

2. A refrigerator according to claim 1, further including insulation provided between said water heater and said refrigeration compartment.

3. A refrigerator according to claim 1, wherein said brew chamber includes an area for receiving a porous package of ground coffee beans.

4. A refrigerator according to claim 3, wherein said area comprises a removable chamber.

5. A refrigerator comprising:
a cabinet including a refrigeration compartment and a supply of water in said cabinet,
a door attached to said cabinet to selectively open and close access to said refrigeration compartment,
a water conduit located in said door to supply water from said cabinet supply of water to a point of utilization in said door,
a water heater in said door arranged to heat water from said cabinet supply of water,
a reservoir for receiving and holding whole coffee beans,
a brew chamber located in said door and arranged to receive a supply of ground coffee beans and water heated by said water heater to make brewed coffee,
a dispensing outlet communicating with said brew chamber to allow for the dispensing of said brewed coffee at said door of said refrigerator, and
a control for controlling said heating of said water and said dispensing of said brewed coffee.

6. A refrigerator according to claim 1, including a collection chamber for grounds used in said brew chamber.

7. A refrigerator according to claim 5, wherein said brew chamber is sized to provide a single serving of coffee.

8. A refrigerator according to claim 5, wherein said reservoir is located in said door.

9. A refrigerator according to claim 5, including a grinding mechanism to grind said whole coffee beans.

10. A refrigerator according to claim 9, including a mechanism for transporting ground coffee beans from said grinding mechanism to said brew chamber.

11. A refrigerator according to claim 10, including a collection chamber for grounds used in said brew chamber.

12. A refrigerator according to claim 11, including a filled collection chamber indicator.

13. A refrigerator according to claim 1, wherein said dispensing outlet comprises a water dispenser in addition to a coffee dispenser at said door.

14. A refrigerator according to claim 1, wherein said dispensing outlet comprises an ice dispenser in addition to a coffee dispenser at said door.

15. A refrigerator according to claim 5, wherein said dispensing outlet comprises a water dispenser in addition to a coffee dispenser at said door.

16. A refrigerator according to claim 5, wherein said dispensing outlet comprises an ice dispenser in addition to a coffee dispenser at said door.

17. A refrigerator according to claim 5, wherein said reservoir is in thermal communication with the refrigeration compartment.

18. A refrigerator comprising:
a cabinet including a refrigeration compartment and a supply of water in said cabinet,
a door attached to said cabinet to selectively open and close access to said refrigeration compartment,
a water conduit located in said door to supply water from said cabinet supply of water to a point of utilization in said door, including a water dispenser to allow for the dispensing of said water to a user,
a water heater in said door arranged to heat a portion of said water from said cabinet supply of water,
a reservoir for receiving and holding whole coffee beans, a grinding mechanism to grind said whole coffee beans, and a mechanism for transporting ground coffee beans from said grinding mechanism to said brew chamber
a brew chamber located in said door and arranged to receive a supply of ground coffee beans and said water heated by said water heater to make brewed coffee,
a dispensing outlet communicating with said brew chamber to allow for the dispensing of said brewed coffee at said door of said refrigerator, and
a control for controlling said heating of said water and said dispensing of said brewed coffee.

19. A refrigerator according to claim 18, wherein said reservoir is located in said door.

20. A refrigerator according to claim 18, including a collection chamber for grounds used in said brew chamber.

21. A refrigerator according to claim 20, including a filled collection chamber indicator.

* * * * *

UNITED STATES PATENT AND TRADEMARK OFFICE
CERTIFICATE OF CORRECTION

PATENT NO. : 7,610,849 B2  Page 1 of 1
APPLICATION NO. : 11/371796
DATED : November 3, 2009
INVENTOR(S) : Bigge et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this

Twelfth Day of October, 2010

David J. Kappos
*Director of the United States Patent and Trademark Office*